United States Patent
Voss et al.

(10) Patent No.: US 9,479,556 B2
(45) Date of Patent: Oct. 25, 2016

(54) SYSTEMS AND METHODS FOR SCALABLE STRUCTURED DATA DISTRIBUTION

(71) Applicant: Goldman, Sachs & Co., New York, NY (US)

(72) Inventors: Matthew Voss, New Providence, NJ (US); Vishnu Mavuram, Plainsboro, NY (US); Scott Cohen, Montebello, NY (US)

(73) Assignee: Goldman, Sachs & Co., New York, NY (US)

( * ) Notice: Subject to any disclaimer, the term of this patent is extended or adjusted under 35 U.S.C. 154(b) by 0 days.

(21) Appl. No.: 14/851,462

(22) Filed: Sep. 11, 2015

(65) Prior Publication Data

US 2016/0072866 A1    Mar. 10, 2016

Related U.S. Application Data

(63) Continuation of application No. 13/863,248, filed on Apr. 15, 2013, now abandoned.

(60) Provisional application No. 61/623,877, filed on Apr. 13, 2012.

(51) Int. Cl.
| | | |
|---|---|---|
| *H04L 29/06* | (2006.01) | |
| *H04L 29/08* | (2006.01) | |
| *G06F 17/30* | (2006.01) | |

(52) U.S. Cl.
CPC ......... *H04L 65/60* (2013.01); *G06F 17/30516* (2013.01); *G06F 17/30557* (2013.01); *H04L 65/80* (2013.01); *H04L 67/1002* (2013.01)

(58) Field of Classification Search
CPC .............. H04N 21/64738; H04L 41/0816; H04L 43/0882; H04L 65/4084; H04L 65/80; H04L 29/06823; H04L 43/08
USPC .......................................... 709/231, 217–219
See application file for complete search history.

(56) References Cited

U.S. PATENT DOCUMENTS 5,341,476 A * 8/1994 Lowell ................... G06F 9/542
                                                     707/999.01
7,421,494 B2    9/2008 Edwards et al.
(Continued)

FOREIGN PATENT DOCUMENTS

JP    2000-295249    10/2000
JP    2002-342593    11/2002
(Continued)

OTHER PUBLICATIONS

Michael Mullins, "Exploring the anatomy of a data packet,", Jul. 2, 2001, www.techrepublic.com, www.techrepublic.com/article/exploring-the-anatomy-of-a-data-packet/.*
International Search Report and Written Opinion for PCT Application No. PCT/US13/36652 dated Oct. 11, 2013, 8 pages.

*Primary Examiner* — Ruolei Zong
(74) *Attorney, Agent, or Firm* — Ropes & Gray LLP

(57) ABSTRACT

Systems and methods for efficiently absorbing, archiving, and distributing any size data sets are provided. Some embodiments provide flexible, policy-based distribution of high volume data through real time streaming as well as past data replay. In addition, some embodiments provide for a foundation of solid and unambiguous consistency across any vendor system through advanced version features. This consistency is particularly valuable to the financial industry, but also extremely useful to any company that manages multiple data distribution points for improved and reliable data availability.

18 Claims, 8 Drawing Sheets

(56) References Cited

U.S. PATENT DOCUMENTS

| | | |
|---|---|---|
| 7,882,257 B2 | 2/2011 | Kerr et al. |
| 7,912,045 B2 | 3/2011 | Page |
| 7,917,457 B2 | 3/2011 | Marfatia et al. |
| 2001/0003828 A1 | 6/2001 | Peterson et al. |
| 2002/0144283 A1 | 10/2002 | Headings et al. |
| 2004/0039834 A1 | 2/2004 | Saunders et al. |
| 2007/0208828 A1* | 9/2007 | Brier ................ G06F 17/30864 709/219 |
| 2011/0246463 A1 | 10/2011 | Carson, Jr. et al. |
| 2012/0144283 A1* | 6/2012 | Hill ..................... G06F 17/242 715/211 |
| 2013/0195203 A1* | 8/2013 | Syed ................ H04N 21/23439 375/240.26 |
| 2013/0235739 A1* | 9/2013 | Mamidwar ......... H04L 41/0816 370/252 |

FOREIGN PATENT DOCUMENTS

| | | |
|---|---|---|
| JP | 2003-223336 | 8/2003 |
| JP | 2003-337778 | 11/2003 |
| JP | 2010-501909 | 1/2010 |
| WO | WO-2002013091 | 2/2002 |
| WO | WO-2008063164 | 5/2008 |

\* cited by examiner

SYSTEMS AND METHODS FOR SCALABLE STRUCTURED DATA DISTRIBUTION

CROSS-REFERENCE TO RELATED APPLICATIONS

This application is a continuation of U.S. patent application Ser. No. 13/863,248, filed Apr. 15, 2013, which claims priority to U.S. Provisional Application No. 61/623,877 filed Apr. 13, 2012, both of which are incorporated herein in their entirety by reference for all purposes.

TECHNICAL FIELD

Various embodiments of the technology of the present application generally relate to data delivery. More specifically, some embodiments of the technology of the present application relate to systems and methods for scalable structured data distribution.

BACKGROUND

There is growing regulatory and competitive pressure on various industries to improve the quality, consistency, and availability of reported data. Storage and processing demands are increasing along multiple dimensions such as granularity, online history, redundancy, and collections for joining together new combinations of data. In addition, intra-day versioning is becoming necessary for managing discrepancies between departments with different timing needs as data is increasingly shared across departments within a company. Departments also are starting to look for the road that will take them from batch processing to incremental real-time and stream data management.

While demand for efficient and consistent data management is growing, many large companies are replacing failing ACID (Atomicity, Consistency, Isolation, and Durability) architecture with scalable BASE architecture. Solutions to view and analyze large to huge datasets are becoming commonplace as these companies release aspects of their cloud-scaling systems to open source. While hyper-scale analysis engines are becoming commonplace, tools to manage movement of data sets have not kept pace. Large companies are scrambling to protect themselves from growing likelihood of outages because they lack means to manage the availability of large data streams.

Many other companies face the same inability to replicate growing data sets. ACID architectures are costly, complex, and wrong for ensuring that data is consistent and available across space and time (e.g., department data sharing and forensics). A higher bar for availability, consistency, and governance of these growing data sets is consistently being set.

SUMMARY

Systems and methods are described for scalable structured data distribution. In some embodiments, a method can include receiving streaming raw data from a data producer. The data can be bundled into packages of data (i.e., bundles) based on an archiving strategy. In some cases, any metadata associated with the streaming data is leveraged for efficient policy driven routing. The metadata can be published, possibly recursively, on one or more channels (e.g., a control channel). Each of the packages of data may be ordered using a series of consecutive integers produced by a master clock. The packages of data can then be archived and delivered (e.g., in parallel) to consumers, which have subscribed to the data producer. The packages of data can be replayed based on the ordering identified by the consecutive integers upon a request from a data consumer.

Embodiments of the technology of the present application also include computer-readable storage media containing sets of instructions to cause one or more processors to perform the methods, variations of the methods, and other operations described herein.

Some embodiments include a system comprising a bundler, a transformer, a stream clock, and an archiving service. The bundler can be configured to receive streaming raw data from a data producer and bundle the data into a series of data packages by associating each of the data packages with a unique identifier having a monotonically increasing order. The transformer can receive the data packages (e.g., from an archive) and generate loadable data structures for a reporting store associated with a data subscriber. The loader can receive and store the loadable data structures into a storage device associated with the data subscriber based on the logical ordering.

Some embodiments can include a master clock configured to generate a logical series of integers, each of which is associated with a single data package in the business aligned, policy driven (declarative) series of data packages. In various embodiments, the system can include a data channel allowing data from a data producer to be continuously streamed to the data subscriber. In addition, a messaging channel can be used to provide a current status of the data being continuously streamed from the data producer to the data subscriber through the data distribution system. A control channel separate from the data channel to allow the data subscriber to request replay of the data may also be used in some embodiments.

While multiple embodiments are disclosed, still other embodiments of the technology of the present application will become apparent to those skilled in the art from the following detailed description, which shows and describes illustrative embodiments of the technology. As will be realized, the technology is capable of modifications in various aspects, all without departing from the scope of the present technology. Accordingly, the drawings and detailed description are to be regarded as illustrative in nature and not restrictive.

BRIEF DESCRIPTION OF THE DRAWINGS

Embodiments of the present technology will be described and explained through the use of the accompanying drawings in which.

Figure 1:
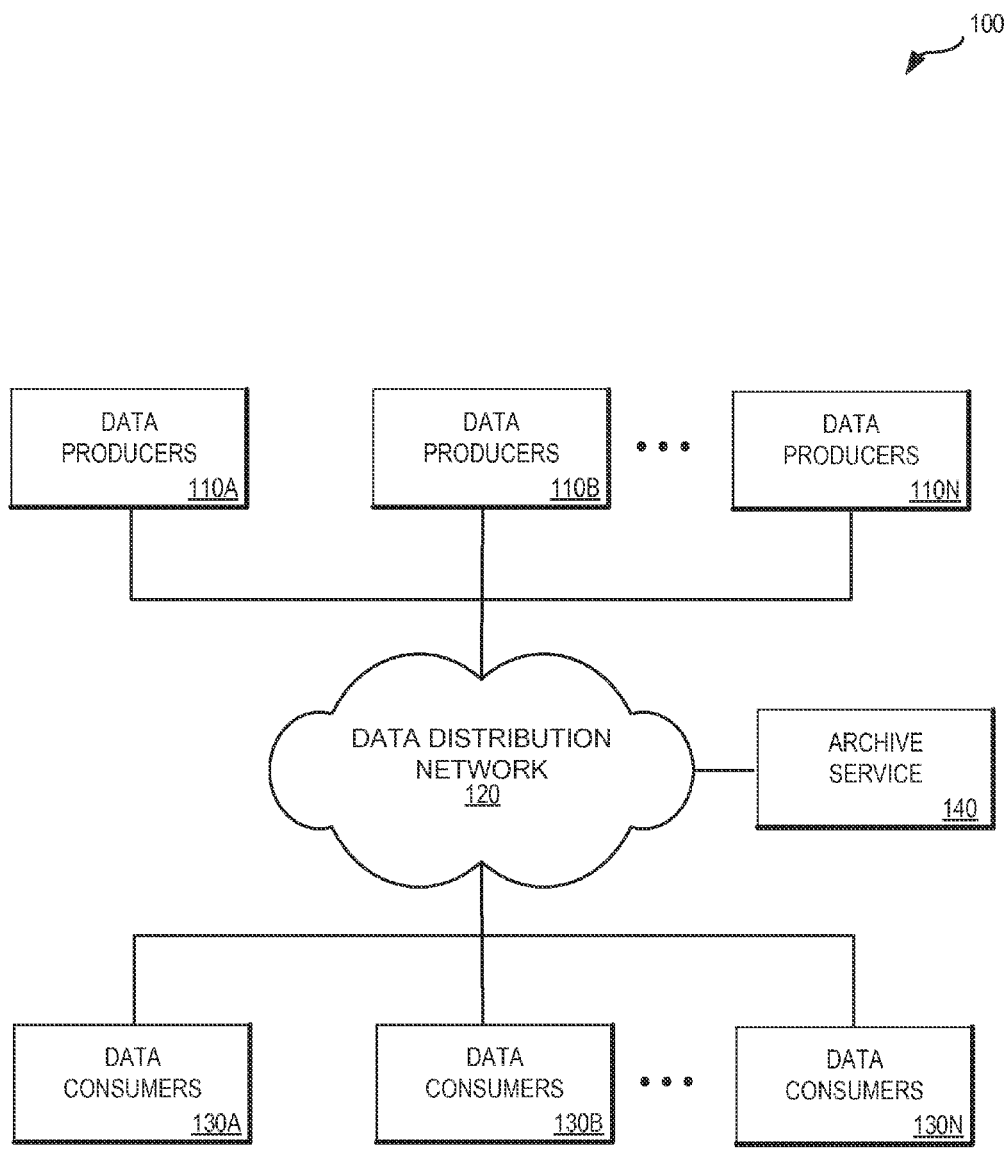
FIG. 1 illustrates an example of an environment in which some embodiments of the present technology may be utilized.

The drawings have not necessarily been drawn to scale. For example, some components and/or operations may be separated into different blocks or combined into a single block for the purposes of discussion of some of the embodiments of the technology of the present application. Moreover, while the technology is amenable to various modifications and alternative forms, specific embodiments have been shown by way of example in the drawings and are described in detail below. The intention, however, is not to limit the scope of the application to the particular embodiments described. On the contrary, the application is intended to cover all modifications, equivalents, and alternatives falling within the scope of the technology as defined by the appended claims.

DETAILED DESCRIPTION

Various embodiments of the technology of the present application generally relate to data management (e.g., the storage and movement of big data). More specifically, some embodiments relate to systems and methods for scalable structured data distribution. Some embodiments provide for a data bus suitable for reliably distributing large volumes of data to multiple clients in parallel. In addition, some embodiments include an integrated system for efficiently absorbing, archiving, and distributing any size data sets as well as providing flexible, policy-based distribution of high volume data through real time streaming as well as past data replay.

Data consumers often desire data to be consistent, available, and partitioned ("CAP"). Achieving all of these attributes instantaneously is often difficult. Delayed consistency is the favorable compromise to make in many institutions where consistency and availability is crucial, but some timing delay can be acceptable. As such, some embodiments of the data distribution system disclosed herein hold consistency, availability, and partitioning sacred, while giving ground only on the timing of consistency. Through a unique clocking scheme used to tag data, various embodiments of the data distribution system achieve the required CAP, eventually.

In order to address scale-out requirements stemming from regulatory and competitive pressures, various embodiments provide for a data flow solution leveraging the BASE architecture. Various embodiments provide for an integrated system for efficiently absorbing, archiving, and distributing any size data sets. The integrated system can provide for scalable distribution (i.e., efficient, simultaneous streaming to any number of consumers), consistency (i.e., consistent live backup, data sharing and forensics support), agility (i.e., vendor independence and rapid adoption of analysis engines), governance (i.e., secure policy-driven management over distribution), and/or forensics (i.e., replay and restore past versions of data at high speed).

In addition, some embodiments of the integrated data distribution system allow developers to identify data in simple terms (schema and business purpose) and submit high volumes of data into a bus where policies govern storage, transformation, and streaming into multiple targets simultaneously. All versions of data sent through the bus can be compressed and stored and then replayed seconds, days or years later with guaranteed consistency into any target. Some embodiments include features that can be applied more broadly including an adaptable component-based, message-driven architecture, stateless and declarative setup, and special compression and optimization features.

Some embodiments bridge data flows with cost-saving cloud technologies across internal and external domains. To this end, some embodiments of the technology can include features to support a variety of distributed/non-distributed flow combinations, such as, but not limited to the following: 1) high volume data capture and replay; 2) policy-based encryption for security on the wire and on disk; 3) high-throughput parallel transport; 4) en-route parallel processing or transformation; 5) superior structured compression; 6) ability to monitor and manage data processing and storage costs at a business level; and/or 7) flexible adapters into and out of repeatable data flows.

While many traditional systems use an imperative data flow, various embodiments of the present technology use rule-based or "declarative" data flow. As a result, provision, subscription, channeling, archiving, and entitlement of all data may be decoupled from any proprietary implementation through a set of well-understood rules. In addition, data can be abstracted from the underlying repository models. Because captured data is kept in ordered, raw form, the data can be replayed from any point in the past into new database solutions, providing an excellent platform for fast adoption of new technologies. Built-in consistency mechanisms help manage simultaneous flows in some embodiments. This allows different data stores to be populated and used in parallel. By using consistent stores in parallel, a new hybrid reporting architecture becomes possible. For example, the combined advantage of tandem relational and NoSQL engines can be made available to the application layer in ways that give new performance and cost-scaling dynamics for large data reporting challenges.

In the following description, for the purposes of explanation, numerous specific details are set forth in order to provide a thorough understanding of embodiments of the technology. It will be apparent, however, to one skilled in the art that embodiments of the technology may be practiced without some of these specific details.

Moreover, the techniques introduced here can be embodied as special-purpose hardware (e.g., circuitry), as programmable circuitry appropriately programmed with software and/or firmware, or as a combination of special-purpose and programmable circuitry. Hence, embodiments may include a non-transitory machine-readable medium having stored thereon non-transitory instructions that may be used to program a computer (or other electronic devices) to perform a process. The machine-readable medium may include, but is not limited to, optical disks, compact disc read-only memories (CD-ROMs), magneto-optical disks, ROMs, random access memories (RAMs), erasable programmable read-only memories (EPROMs), electrically erasable programmable read-only memories (EEPROMs), application-specific integrated circuits (ASICs), magnetic or optical cards, flash memory, or other type of media/machine-readable medium suitable for storing electronic instructions.

Terminology

Brief definitions of terms, abbreviations, and phrases used throughout this application are given below.

The terms "connected" or "coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed therebetween, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

If the specification states a component or feature "may", "can", "could", or "might" be included or have a characteristic, that particular component or feature is not required to be included or have the characteristic.

General Description

FIG. 1 illustrates an example of an environment 100 in which some embodiments of the present technology may be utilized. As illustrated in FIG. 1, data producers 110A-110N produce data that is distributed over data distribution network 120 to data consumers 130A-130N. In accordance with various embodiments, data distribution network 120 achieves scalable data flow through a combination of features. Data generated by data producers 110A-110N can be structured, and flow processing components can all be given awareness of this structure. This awareness can be injected at runtime and can even be injected per work cycle, if needed, for more dynamic resource sharing. By structuring the data generated by the data producers in a systematic manner, various embodiments can take advantage of one or more of the following features: 1) efficient in-process and on disk columnar compression; 2) separation of data and control flow; 3) transparency and monitoring of flow by surfacing important business constructs; 4) ability to efficiently manage streams through subscriptions, filtering, forking, or merging; and 5) ability to implant structured data services into the flow such as key-generation services upstream of target data stores.

In some embodiments, data distribution network 120 includes flow processing components that push all products to external services for state management and recovery on a per work-cycle basis. Services that save down state can be specialized for that purpose. In this way, all the heavy processing components of the system recover off of external service state and can be made completely dynamic from cycle to cycle. The stateless rule of processing is to read progress from the downstream product through a designated stateful service that specializes in managing state (no processing). Similarly, flow processing components may only receive the input pushed to them or request it from a declared upstream service.

One way to visualize embodiments of the design is to think of flow processing components as segments of pipe that can be dynamically attached to compatible upstream and downstream segments of pipe. Pipe connectivity is highly dynamic in that more processing can be spun up between stateful components without need to upload or restore any previous state information. In various embodiments, there is only one stateful service component from which all other stateful services can eventually recover. This is the raw data archive service 140. Archiving requirements of all downstream state services can be relaxed in some embodiments.

Figure 2:
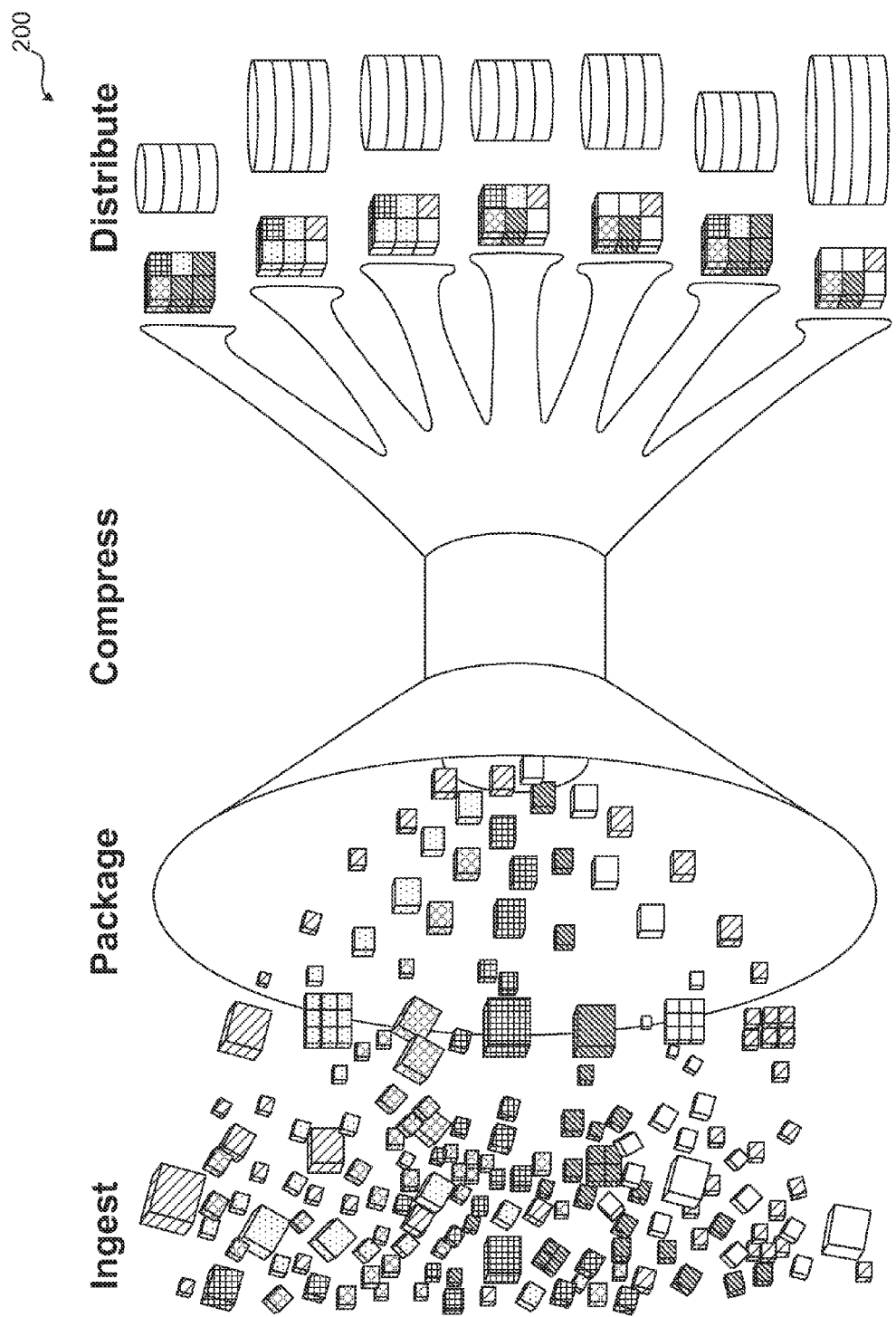
FIG. 2 illustrates phases of operation of a data distribution system in accordance with one or more embodiments of the present technology.

FIG. 2 illustrates phases of operation of a data distribution system 200 in accordance with one or more embodiments of the technology. As illustrated in FIG. 2, data distribution system 200 is able to ingest streaming data from one or more data producers 110A-110N. As explained further below, the data is then bundled into discrete data packages that can be compressed (e.g., using columnar compression). These discrete data packages are then distributed to one or more data consumers. Substantially simultaneously, the discrete data packages may be provided a unique identifier and archived (not shown in FIG. 2). The data consumers can then unpack the data from the discrete data packages and generate reports or otherwise use the data.

Data distribution system 200 may have a pluggable component architecture. The data distribution system can have processing components and stateful services. In some embodiments, the processing components can include two-channel pipe segments—one channel for data flow and one channel for control flow. The stateful services may also have separate data and control channels, but serve as demultiplexors for multiple destination fan-out as illustrated in FIG. 2. The components can be language and platform independent. Contracts between components can be implemented through messaging subscription/publication, which includes instrumentation output through narrow delivery APIs of a store/fetch nature and through process control APIs for startup/shutdown.

External components behave very similarly from an operational standpoint. They publish consistent instrumentation information aligned with the distributed master clock so that progress and capacity can be understood through the system. Instrumentation can be aligned with the unique identifiers of the data packages (i.e., bundle IDs). That is, there are instrumentation events at the beginning of consuming a bundle or upon completion of processing a bundle. This aspect of instrumentation lines up the instrumentation events with the master clock. Lining up instrumentation with master clock events allows for the instrumentation aligned with the stream clock events to act as a control event.

Components of data distribution system 200 extend beyond basic transport and can be used in any step towards end-delivery of data. Some embodiments provide for a data-curation process that shapes data into a format accessible in the future. If the data needs to be recovered or replayed, the archive can locate and retransmit an exact replica of the data based on the unique identifiers. For example, would also follow the dual-pipe stateless process model with consistent instrumentation. In this way, capacity and monitoring can be managed with a single toolset all the way through the flow.

Data distribution system 200 can maximize event efficiency because durability requirements are not essential downstream from the archive. Durable messages are only required coming into a bundler for packaging and archiving. From that point on, all data is repeatable in view of the unique identifier and packaging. Non-durable topics are used to publish all activity out of and downstream of the bundler, greatly reducing the infrastructural burden.

By making the component configuration of the data distribution system 200 declarative, the system can dynamically spin up flow processing components, as explained above. By making data structure and data source models declarative, the system provides operational transparency on those sources and a simple means to build a public catalog of what data is available from where. Declarative subscriptions can be used to precisely understand the data flows shared between departments using data distribution system 200. All data and control signals may be pushed through the system, thus allowing a declarative contract and decoupling between publishers and subscribers of data along with dynamic setup and scaling.

Figure 3:
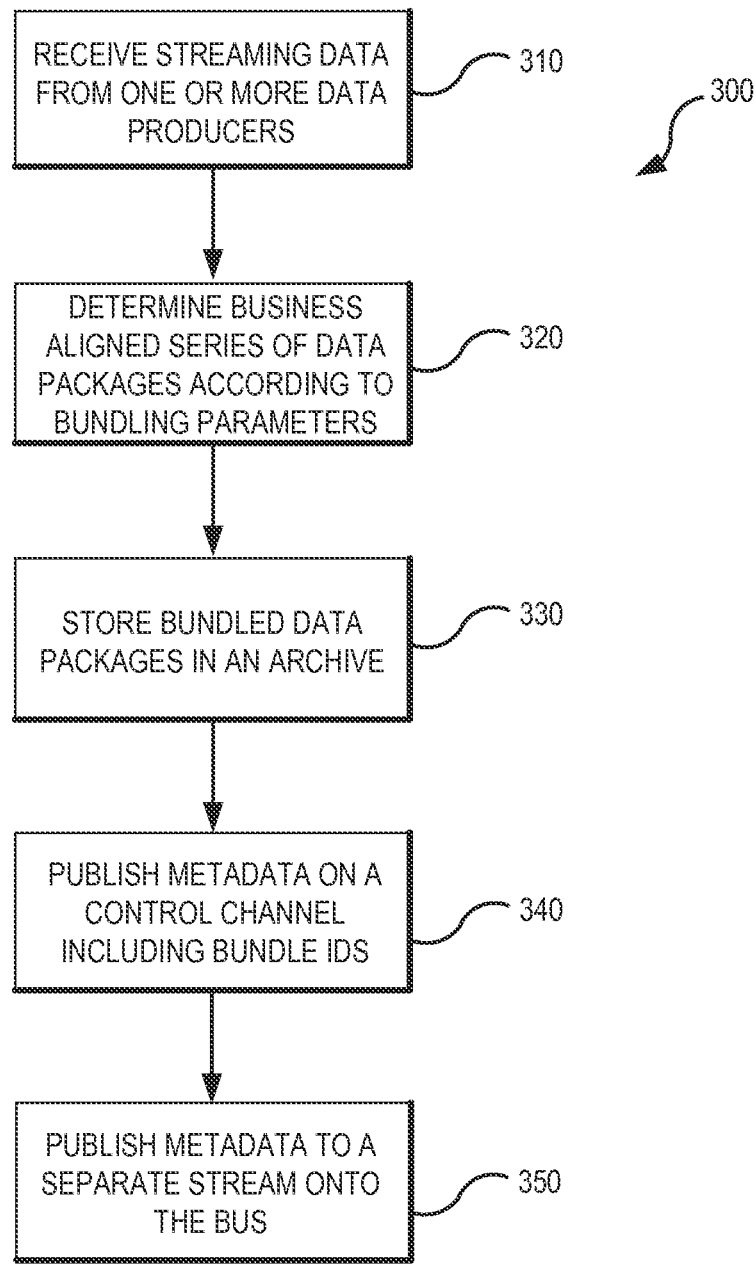
FIG. 3 is a flowchart illustrating a set of operations for bundling data in accordance with various embodiments of the present technology.
Figure 5:
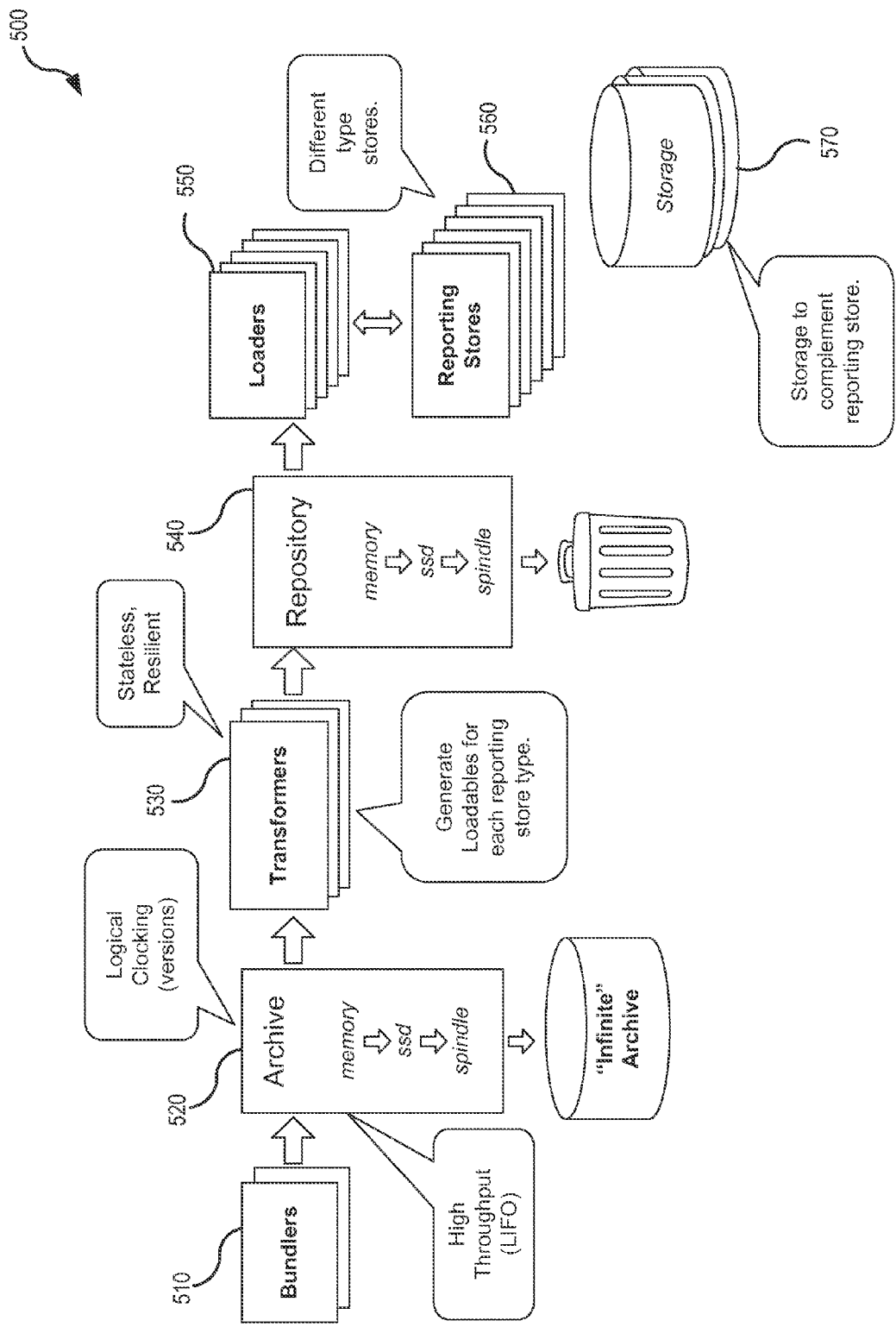
FIG. 5 illustrates a set of components of a data distribution system in accordance with one or more embodiments of the present technology.

FIG. 3 is a flowchart illustrating a set of operations 300 for bundling data in accordance with various embodiments of the present technology. Receiving operation 310 receives streaming data from one or more data producers. Determination operation 320 determines bundling parameters (e.g., bundle size) for bundling the disparate small pieces of the streaming data in accordance with the bundling parameters. The bundling parameters can include business rules that allow a business to determine how the data should be grouped or bundled (e.g., by a bundler as illustrated in FIG. 5) into the data packages (e.g., based on content, source, expected use, etc.) In some cases, the bundler can aggregate raw messages or data before any transformation is performed. The bundles can be assigned a monotonically increasing bundle ID or other unique identifier to sequentially order the bundles. This unique ID may be a public ID that is leveraged in reporting for versions, verification, and any other query activity that needs to leverage guaranteed order of bundle stream data.

Storing operation 330 stores the bundled data packages in an archive. Publishing operation 340 can then publish metadata associated with the bundles on a control channel. In some embodiments, the metadata can include bundle IDs. In addition to publishing the metadata on the control channel, publishing operation 350 may publish the metadata to a separate stream. While the control information can be sent out on a non-durable topic, an identical copy of the control data may be available with the data itself. Some advantages of including the control data with the packages include the following: 1) exact behavior of the system can be read and replayed from the archive as the package contains all events and data; and 2) control summary information including index information located in the bundle itself allows for fast scanning of the files (just the index), eliminating the need to scan through the entire file in many cases.

Figure 4:
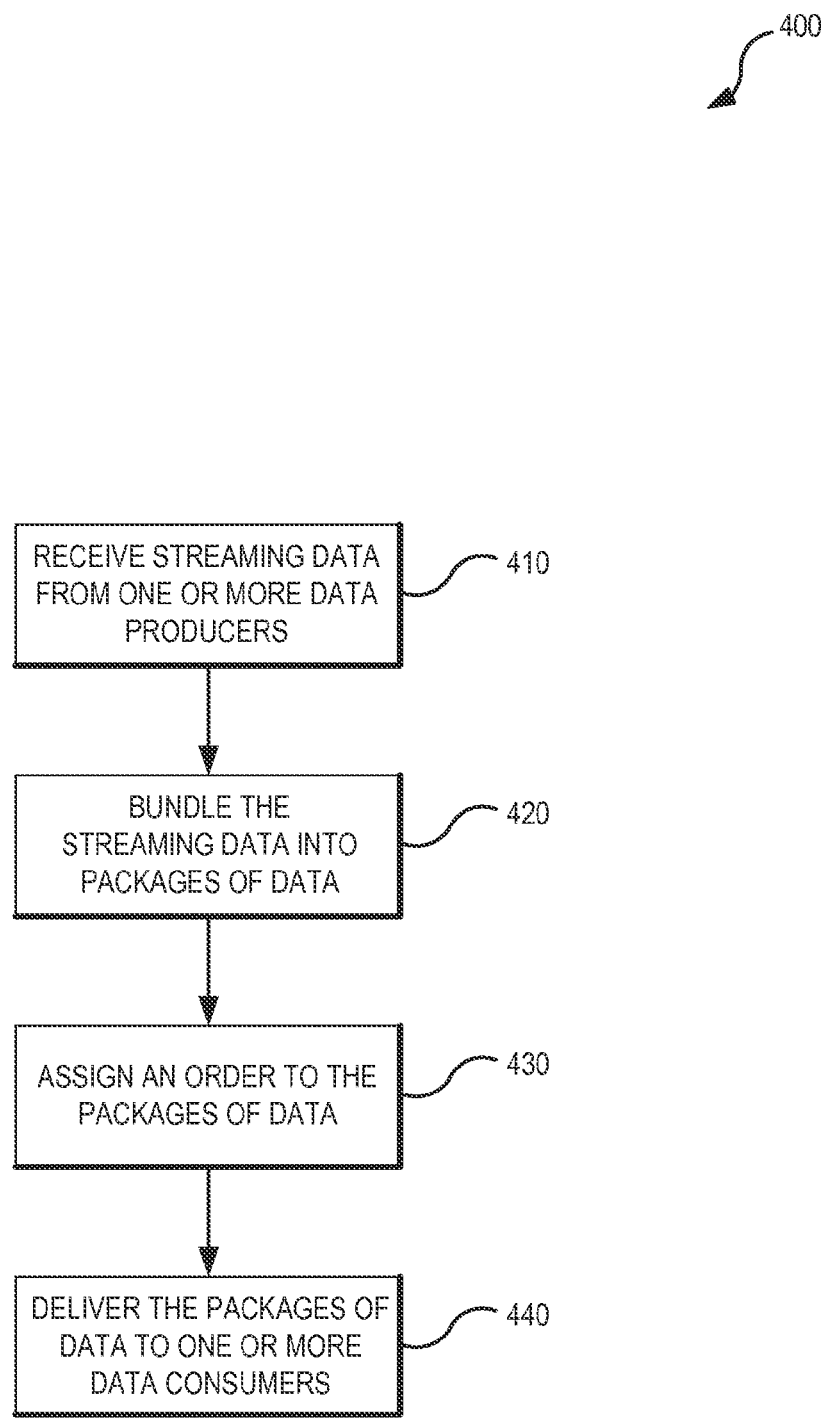
FIG. 4 is a flowchart illustrating a set of operations for processing data streams in accordance with some embodiments of the present technology.

FIG. 4 is a flowchart illustrating a set of operations 400 for processing data streams in accordance with some embodiments of the technology. One or more of these operations can be performed by various system components such as a submission service or a bundler. As illustrated in FIG. 4, receiving operation 410 receives streaming data from one or more data producers. Bundling operation 420 bundles the streaming data into data packages, as illustrated in FIG. 3, that are assigned a unique identifier by ordering operation 430. Delivery operation 440 delivers the data packages with the assigned unique identifier to one or more data consumers.

Bundling operation 420 can aggregate disparate small pieces of information that enter the data distribution system into larger logically-clocked blocks of data, data packages, or bundles. The aggregation of large data flows performed by bundling operation 420 allows the system to leverage the separation of data and control. By tuning bundle size and controlling information that is included in the bundle's metadata, the system can create many-fold efficiency for managing data by the bundle's metadata (a.k.a. control data). Various embodiments allow for the selection of the content of the control data in order to tune decisions for large data flows.

Aggregation or "chunking" of the data by bundling operation 420 also has the direct and simple benefit of improving 10 performance. In some embodiments, bundling is closely related to serialization and identifying the order of the bundles by a unique ID, which can be useful in creating reliable distribution of data. Data flow cannot be reliably reproduced in multiple locations (e.g., primary and backup) without consistent ordering given by the serialization and identification.

FIG. 5 illustrates a set of components of a data distribution system 500 in accordance with one or more embodiments of the technology. As illustrated in FIG. 5, data distribution system 500 can include bundlers 510, archive 520, transformers 530, repository services 540, loaders 550, reporting stores 560, and storage 570.

From a data flow perspective, bundlers 510 may sit between a submission service and archive service 520. The submission service, while not shown, receives the raw streaming data from one or more data producers and feeds the raw data into the bundlers 510. Bundlers 510 create serially ordered bundles for specific data streams—that is, there is a specific set of coordinated bundler processes for each type of message flow. These coordinated processes create an aggregated data representation and sends it to the archive service.

Given that bundles are generated and flowed in monotonically increasing order, different "bundle streams" may be created to facilitate dynamic acceleration of different parts of a data flow where some bundles are made to flow faster than others based on some selection criteria. A selection of metadata can be used to identify and separately enumerate a series of bundles.

As an example, multiple bundles can be constructed by the following criteria: Business Date, Type:={Greeks|CreditGreeks|UnderlierAttributes}, and Region:={GL|AS|EU|AM}. This will result in twelve bundle streams flowing through the data distribution system per business date; the unique identifier for each bundle stream must be separate to allow for prioritization, and gapless and ordered monotonically incrementing unique IDs.

In some embodiments, the bundle contents can include control data that is packaged together with data into bundles. While the control information also is sent out on a non-durable topic, an identical copy of it is available with the data itself. Some advantages include the following: 1) exact behavior of the system can be read and replayed from the archive since the bundles contain all events and data; and 2) control summary information including index information located in the bundle itself allows for fast scanning of the files (just the index), thereby reducing or eliminating the need to scan through the entire file.

A bundle can be an aggregate of raw messages before any transformation is performed. Bundles may be serialized via the unique identifier, which may be a monotonically increasing bundle ID. This unique identifier may be a public ID that is leveraged in reporting for versions, verification, and any other query activity that needs to leverage guaranteed order of bundle stream data. A bundle message may include any of the five following sections: 1) a summary section; 2) a quality section; 3) an index section; 4) a checksum section; and/or 5) a data section.

The summary segment of the bundle can be used to uniquely identify a bundle with key information and also those top-level attributes of a bundle that are generally interesting across all types of data such as the data stream that is bundled, the bundle series number, row counts of tabular data, and data segment size. In some embodiments, the summary segment may be sent independently of all other sections as a fast control signal.

The quality sections are optional light-weight reserved segments in bundle messages that are at the discretion of sourcing processes to populate. For example, a pricing process might supply indicators about the nature of the data it is producing such as sanity check failures. By placing sanity check failures in a special area for consumption independently of data, sourcing can supply higher-velocity information to subscribers to this quality segment. Infra teams might subscribe to such signals to know ahead-of-time of bad data as soon as it hits the bundler. MR analysts might also subscribe to certain signals to get early warning of sanity check failures. The size of these message segments will be physically limited, and the usefulness will depend on how well-organized the data is when provided.

The index segments are optional bundle segments that indicate the content of the bundle in a condensed form that is useful for tracking and problem-solving. Unlike quality segments, index segments may be built by the bundler using a business aligned policy based key-rule applied to tabular data. Index segments might be a fraction of the size of the data itself, but are expected to be sometimes larger than summary and quality segments.

The checksum message segment can be included in messages that contain the data segment. By including the checksum message segment, the data loads become independently verifiable in all distributed locations. In some embodiments, the checksum message segment includes a checksum representing an aggregation/sum/hash of all columns of the tabular data in the data section.

In some embodiments, the data segment of the bundle can be a tabular reformulation of a collection of messages or data. The data can be kept in a neutral form. The format of the data may be selected by balancing between keeping consistent with incoming message formats and being optimized for transformation into several other forms. Typically, the data segment can be any size up to the maximum size allowed for a bundle.

In some embodiments, the archive service 520 stores complete bundles that include all segments. By storing complete bundles, fault tolerance as well as back-population of new systems using replay can be provided. In addition, storing complete bundles also has an optimization benefit and impact to light-weight messaging since control messages need not be durable; if all message segments are retained in an available archive store, then non-durable messaging strategies can simply be backed by archive polling to take advantage of more efficient distribution.

The summary segment provides the key information to uniquely identify a bundle and is what allows different messages about the same bundle to be associated. Non-key elements of the summary section provide some general characteristics that are useful for viewing and identifying a segment visually in monitoring tools (e.g., data count, size, data flow, and bundle number). Messages that have the data segment may also include the checksum segment. By including checksum segments with data segments, distributed independent locations can independently verify data quality post-transformation and upload without needing to cross-reference other locations. This independence is a key enabler of low-touch reliable distribution of large amounts of data.

Using these constraints, any other message combinations can be created according to what is needed. A simple strategy is to create a lighter-weight message that includes everything except data as the control message. If segments are consistently light-weight, this strategy results in just two bundle types for a particular data stream—the control message including summary, quality, index, and checksum information, and a full data message that includes all of these plus data. The bundler could publish these two message types according to rules configured for dynamic message cargo.

As an example, the summary section may contain the following structure: the name of each value is shown before the ":=", and the value can either be an enumerated list of exclusive items, a type of data or another structure.

```
Summary := {
    SourceComponentType := { Bundler | Transformer | Loader }
    SourceComponentId := <arbitraryString>:<instanceNumber>
    BundleStream := {
        BusinessDate := <date>
        Type := { Greeks | CreditGreeks | UnderlierAttributes }
        Region := { GL | AS | EU | AM }
    }
    Size := <integer>
    ComponentFields := {
        bundleId := <integer> // used by bundle only
        firstBundleId := <integer> // used by transformer/loader
        lastBundleId := <integer> // used by transformer/loader
    }
}
```

Additionally, values that need to be selected on or inspected prior to message parsing may be included in the Message properties section (limited to strings and numbers only). For example, to allow for filtering, a stringified version of the bundle stream will be added as a string message property. Dates, time stamps, and any data that must be parsed to interpret should only be included in the payload of the message (the JSON text).

Data is bundled and tagged with a unique identifier by bundlers 510 and placed into archive 520. Transformers 530 pull data from archive 520 to convert it into consumer-friendly load data. Loaders 550 aligned with target reporting stores 560 ensure the data is loaded according to contract (serial and atomic bundles).

Archive 520 and repository services 540 manage state storage. The archive service can repeat all flows through the system. Achieving consistency in distributed data requires a solution to ordering of events that affect data. Data distribution system 500 achieves consistency by distributing events as data and achieving order and integrity of that delivery to all consumers via the monotonically increasing unique identifiers. To put this in terms familiar to database administrators, data distribution system 500 manages the delivery of the transaction log components in an efficient and consistent manner to all databases and data stores of all types. The transaction log component stream is the flow. This is a reverse of the way technologists usually think about databases. The transaction log is normally considered to be backing the data in a database, not at the forefront of multiple databases.

To guarantee consistency under adverse circumstances, this stream of transaction data is persisted and made re-playable. This persisted re-playable stream is the center of the pipeline state. It is the only state that needs to be carefully managed for recoverability. All components and state downstream of this stream are recoverable at whatever rate the stream can flow.

Reversing the positioning of transaction log and database in a system can add complexity to applications built upon such a paradigm. Applications built on top of this type of delivery need to be mindful of version metadata if they need to compare data between different physical locations. One goal of the data distribution system is making this versioning paradigm as adoptable and simple as possible by establishing the simplest possible foundation for a distributed versioning scheme. At the heart of this versioning scheme is a new clocking methodology aimed at precise distribution.

Various embodiments of the present technology use monotonic consumer-aligned clocks and streams. One example of a clocking and ordering device is an increasing series of integers without gaps. Data distribution system 500 guarantees that for every designated data stream, there is one and only one contiguous series of integer ticks ordering the data (i.e., the Master Clock).

The most important aspect of the Master Clock is the alignment relative to the consumer. The ticks of the clock are aligned with consumer upload. Each tick represents a loadable set of data or "bundle". For clients to get the benefits of consistency in the system, they must load each bundle in the transaction and in the order delivered by the clock. In other words, each bundle is an atomic upload client. This is made easier for clients by having a deterministic naming scheme with which to fetch any needed bundle and a deterministic series of bundles to be delivered (monotonically increasing order).

Data streams can be configured from any data series to establish independent data flow. What this technically means is that the stream will have its own independent series of clock ticks. This allows the stream to be run at a different rate from other streams. Any set of dimensions in a data set can be called out to declare a stream. Typically, these are aligned with different flow priority. For example, if a data set consisting of client price valuations were divided into streams by business date and business prices for a select business date, business could be allowed to flow at a higher priority to other businesses.

Some embodiments of the present technology allow for the ability to reference streaming data by allowing a contract to create referenced immutable archives immediately after consuming and writing down the data. The bundles that are created for distribution are forever identifiable through a well-defined reference strategy, which relies on their streaming package (bundle) identity. This approach, along with business-aligned archiving rules, bridges streaming and archive data almost as soon as data is written to disk. Every signal about the data or report related to the data can leverage permanent reference to the package. Data lineage is given very immediate (near real-time) support in a streaming environment.

Distributed delivery to multiple targets could introduce a nightmarish reconciliation requirement. Various embodiments of data distribution system 500 include reconciliation in the flows through checksums. Checksums can be included in control messages with every data bundle. These checksums are used to ensure that data is as expected after delivery to target store.

Data distribution system 500 can employ a columnar checksum strategy. This strategy is threefold effective over row checksums. First, columnar checksums are in line with columnar compression optimizations. They can be much more efficient when compared with row checksums. Second, columnar checksums can work across different data stores and be given tolerance for rounding errors across platforms with different float representation. Third, columnar checksums are a more effective combination with columnar subscriptions where clients subscribe to only a subset of columns of data.

Figure 6:
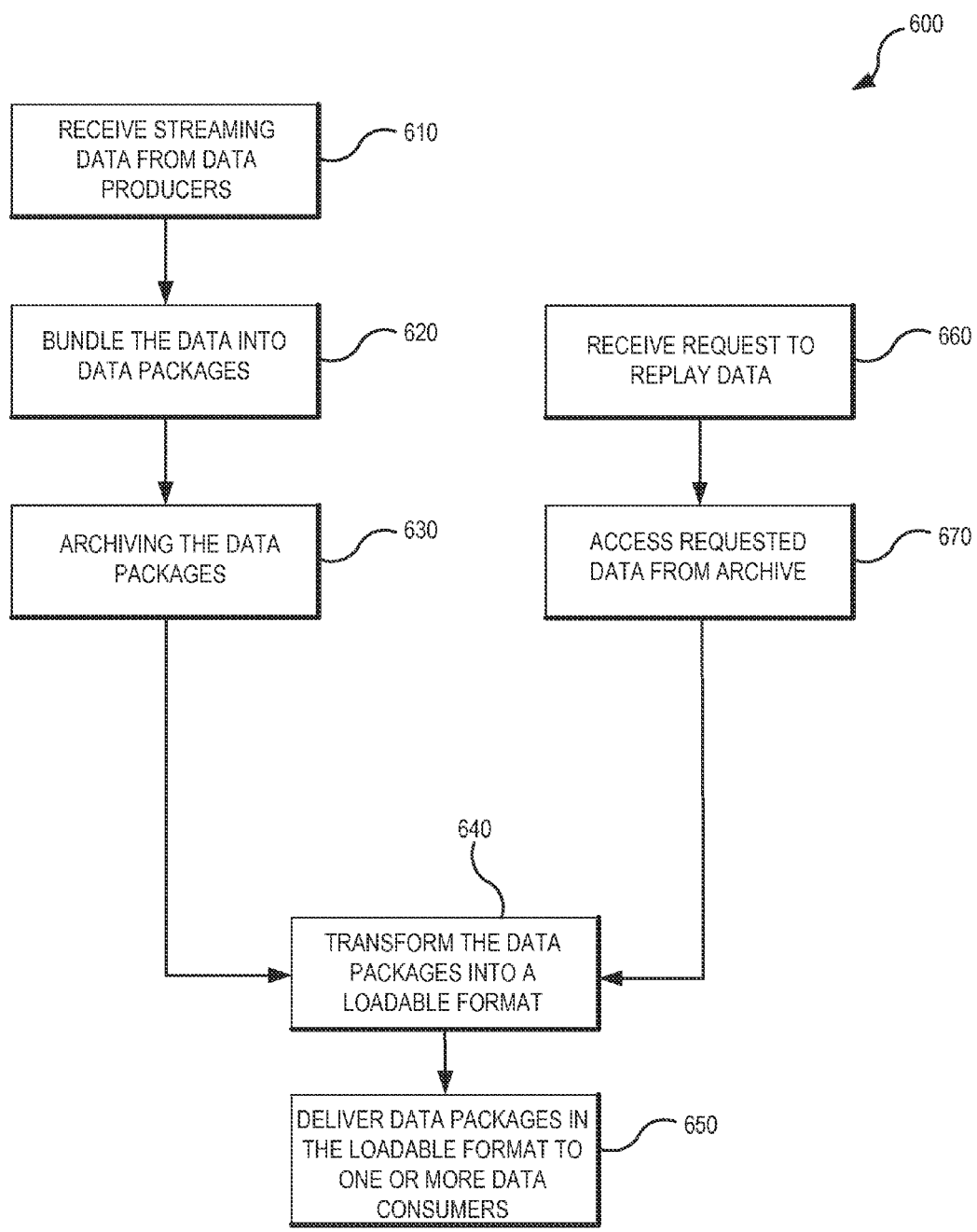
FIG. 6 is a flowchart illustrating a set of operations for delivering data in accordance with various embodiments of the present technology.

FIG. 6 is a flowchart illustrating a set of operations 600 for delivering data in accordance with various embodiments of the present technology. As illustrated in FIG. 6, there can be two threads running within the data distribution system. One thread can allow the data packages received from produces to be archived and automatically pushed to any data subscribers. The second thread can allow data subscribers to request that some of the data be replayed.

Receiving operation 610 receives streaming data from one or more data producers. Bundling operation 620 can bundle the data into data packages that are assigned unique identifier which are ordered. The data packages can then be archived using archiving operation 630. Transformation operation 640 transforms the data packages into a loadable format requested by the subscriber. The data packages can then be delivered to the data consumers in the desired format using delivery operation 650.

When replay operation 660 receives a request to replay some of the data packages, then retrieval operation 670 can retrieve the desired data packages from the archive. These data packages are then transformed, using transformation operation 640, into a loadable format requested. The data packages can then be delivered in the desired format using delivery operation 650.

Figure 7:
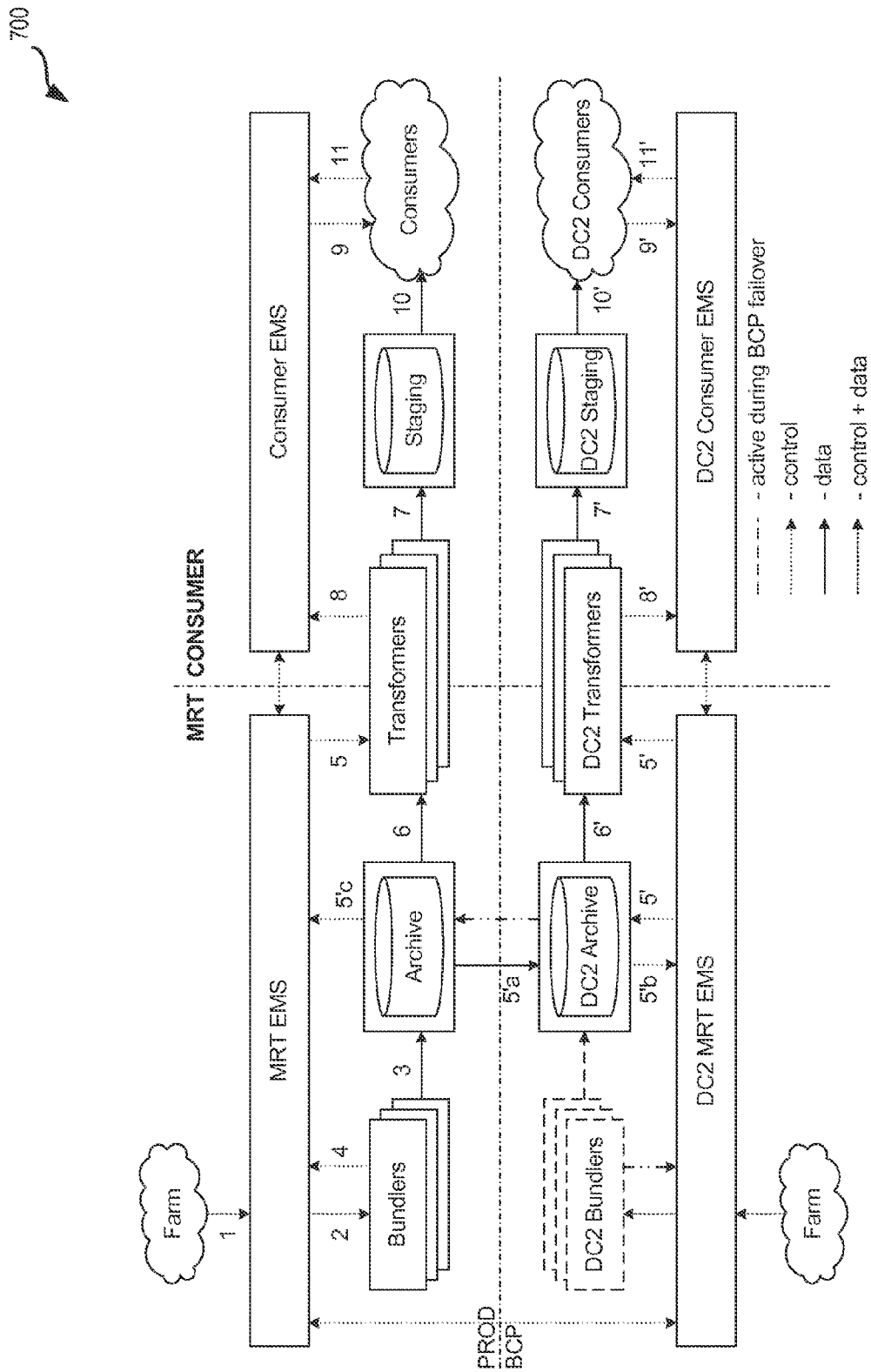
FIG. 7 illustrates an overview of a data distribution system architecture which can be used in one or more embodiments of the present technology.

FIG. 7 illustrates an overview of a data distribution system architecture 700 which can be used in one or more embodiments of the present technology. FIG. 7 shows how message and control data are replicated exactly from Archive to DC2 Archive. There are two basic options for fault tolerance of the Archive. Guaranteed-local replication and across partition (e.g., to the DC2 archive). For MRT, the data flow is reproducible, and so local guarantees with 15 minute replication to partition satisfy those needs. For transactional activity, higher degrees of guarantee of data replication across partitions may be warranted.

The archive service employs tiered storage to get maximum throughput. Tiered storage allows the archive to fulfill its role as a high volume demultiplexer (write once, read many). Data can be written to the archive service, and subsequently, almost immediately, read by multiple consumers. Various embodiments of the present technology include an API for consumers of bundles from the archive. The API can be very simple, but can make clear the responsibility of consumers of bundles (callers of the API—which are primarily the transformers) to declare what bundles they are asking for—which enforces the principle that consumers know the state of bundles to consume. This allows for clarifying one-way dependency as well as fault recovery responsibilities. For example, the AP can be a single function such as the following: MsgArchive::Get Bundles (data stream, start number, max bundles, max data size, max wait time).

Data consumers also can interact with the archive indirectly through events that are fired after archive write. Publishing of all data in small bundles can allow various embodiments of the technology to function efficiently and flexibly when small messages requiring atomic handling and real-time load increase in frequency.

Transformers may only partially transform data (i.e., they are responsible for maintaining the basic schema, aggregation and pivot of the structured data they consume from the archive service). The "transformation" is a conversion to an upload-friendly format. Each transformer may consume a consecutive sequence of bundles for a specific data stream and convert it into a form that is loadable and uploads it to the Transform Repository Service. Oftentimes, the product of a transformer can be consumed by multiple loader processes.

Transformers can be stateless and may make incremental progress on the data stream. As a result, the transformer may pick up state from their output (from the transform repository), and so, emergency maintenance is possible by simply deleting or moving output in the repository; the transformer will continue work from the end of the latest batch in the repository in which it writes. Consumption follows the Subscription With Heartbeat pattern that facilitates message push and pull according to dynamic message cargo configuration. The transformer can operate on a per bundle stream basis, allowing each stream to be generated in isolation and prevent one bundle stream from holding up another. In accordance with various embodiments, transformers may be owned by the producer/provider of data and are the sole consumers of raw data bundles to ensure that external consumers do not directly consume bundle messages. Instead, transformers can consume the product of transformation according to a declared contract.

This service is much like the Archive Service for bundles, but it stores transformed product of the transformers. Transformed data packages can be significantly larger than bundles, consisting of multiple bundles in an upload package.

Loaders upload optimized packages from the Transform Repository Service into a designated target store. The loader configuration is provided at runtime and includes Transform Repository Service, target store and data schema information. Much like the transformer/archive service relationship, loaders can subscribe to Transform Repository control signals and pick up what is needed from the Transform Repository Service. Also like the transformer, loaders leverage state in the targeted stateful store to ensure the bundles received are not repeated. This responsibility is made clear by the fact that the transformer API requires the loader to give the starting bundle ID of batches to fetch. Only the loader has insight into load state in its target store and how it has progressed, so it makes sense for the loader to drive the requests for data. Note that this does not mean that the loaders are purely polling. Like transformers, loaders leverage the Subscription With Heartbeat approach to collecting data that gives the best of push efficiency with the added monitoring reliability of heartbeats.

Loaders create an additional Load Control Stream into the target store for every data stream. This second stream is a store-specific load table history and checksum reconciliation result. It represents a particular data target's load record and checksum results. Note that the data stream is independent of this load record stream.

Various streams created by embodiments of the technology can be designed to facilitate high volume loading into a variety of reporting stores. For this reason, and because update-in-place is not an option for many types of stores, data streams are often best captured as tables of immutable events. When taking this approach, the data table becomes logically identical across all such reporting stores. It contains no instance-specific concepts such as time stamps. All instance-specific information is captured in the Load Control Table. One advantage of removing time stamps is the simplicity created in the clean separation of a data table that is logically identical across systems, while the Load Control Table is instance-specific. The unique identifiers can be used as a quasi-universal clock increment, so no time stamps would be needed in a data table to understand relative versions. The Load Control Table maps instance-specific times to stream time for a particular data store.

Some embodiments support distributed transactions of any length or size and across any number of different data streams through a logical, rather than physical, approach to transactions. Transaction completeness is enforced at destination, and timeout is configurable. Transactions are a type of logical data set with an added service for timeout. Distributed transactions can be achieved in one or more embodiments by flowing a special transaction condition on a separate channel from the data and assigning all data of the intended transaction with a transaction ID. The transaction signal contains a transaction ID tag and a timeout threshold. Completion criteria consistent with a rule such as "Row-Count" and a measure such as "2555" can be sent along with this initial signal if it is known, or sent at a later point if unknown. All data submitted with this identity is considered part of the transaction. The idea of logical transactions is to flow all transaction information to every target data store, even pending and uncommitted transaction data. The machinery of the transport processes pushes information completely agnostic to transactions between streams.

Data elements of a transaction may be assigned a unique transaction ID. For components like the bundler, transformer and loader, this ID may be just another dimension of the data with no special purpose. The transaction ID can be assigned to any data elements across one or more streams without restriction. For sophisticated transaction handling of complex granular transactions, gaps between elements that are assigned the transaction ID are even allowable, and so, any transaction across data elements can be specified.

Completion criteria for a transaction may be distributed to all end data stores via a separate transaction stream. Completion criteria can be as simple as the number of rows expected in every stream (or landing table) affected by the transaction, or as complex as rule-driven configuration allows. Completion criteria can include a time-out interval in some embodiments. From bundler, archive, transformer, and loader perspectives, a transaction stream is a stream like any other within the data distribution system. There does not have to be any special handling that is different from any other high-speed, light-weight stream (like user edit streams). Completion criteria can arrive at any time before or after the data to which it refers.

As a consequence of this, and in order to elegantly support distributed transactions, transaction IDs for which there are no completion criteria may be considered pending transactions, and all data associated with them may be considered incomplete. IOW, the presence of a non-zero transaction ID, is all that is needed to mark data as part of a transaction, and absence of any supporting transaction information is interpreted exactly as a transaction that had not yet met completion criteria.

A special Transaction Completion Process (or TCP) may run against a designated authoritative reporting instance and subscribes to all loader events that may affect the transaction streams that it handles. This process encapsulates all the logic for determining if a transaction is complete based upon completion criteria and data that has arrived. Note the implementation and configuration advantages of confining this complex logic to one process and advantages of keeping this complexity out of the reporting/query API. TCP may hold a simple cache keyed by the transaction ID of all pending transactions. As data arrives, it would update transaction completion status in the End Data Store and remove the completed transaction from the cache. Like other robust system components, TCP could leverage only the end data store state for start-up/recovery. Completion status can be updated by publishing to the Transaction Stream. This gives consistent transaction status to all distributed stores.

Completion status events may contain the transaction ID and maximum bundle IDs of data that satisfies the transaction completion criteria. If a normalized table is used for transaction status with one row entry per data stream (a general, flexible and probably best approach), completion criteria can be specified only for tables where data is expected, and the completion status bundle ID will be the max bundle ID of the data that completed the transaction. Similar to other pipeline components that process streams, TCP publishes start and end handling for all transaction stream bundles (for consistency of monitoring, support and extension). TCP does not need to publish receiving signals from other data streams, however, because it is not transacting writes or commits in those streams. TCP handles Time-Outs by marking the status of any transaction exceeding a given time limit as 'Timed Out' (and also removing the timed out transaction from the cache of pending transactions).

Reporting queries leverage completion criteria in the Transaction Stream to query data when the Bundle ID is less than the Lowest Pending Tran Bundle ID. The simplest interpretation of transactions is to ignore any data bundles that are equal to or greater than the start of pending transactions where Transaction Status is not equal to a Timed Out, thereby ignoring timed-out transactions For more complex transaction handling, TCP would be enhanced to check its cache of pending and progressing transactions for overlap on specified key spaces (combination of dimensions) and would publish/write transaction failure for latter transactions that collided with key spaces of other pending transactions.

Conveniently, the increasing complexity that is put into TCP for granular transactions can reduce the complexity of queries. Queries of complex granular transactions need not select from Lowest Pending Tran Bundle ID; they can simply select only where transactions have a successful complete status. Notice that by designing transaction completion handling into a single process, it becomes easier to configure different processing strategies for sets of streams as configuration rules when starting up a TCP. Sophistication of transaction processing can grow without complicating other core system components.

Because transaction assignment is orthogonal to bundles and completely flexible in how it can apply across data, transaction implementations can grow more sophisticated than with a bundle-dependent approach. Business-specific handling of what constitutes a collision can be encapsulated in the TCP, and query logic as a result can become even simpler than with less granular block-based selection.

Because processes within the system keep purely to their basic transportation responsibility, performance abnormalities and problems can be more easily isolated and understood. Load balancing and optimizations are not complicated by table-locking or any other type of inter-play or wait-for-completion in the flow. Since all transaction information is published to the end data store, it is reportable. It becomes a simple matter to investigate excessive numbers of collided transactions or time-outs.

Various embodiments of the technology keep primary components as purely a transportation infrastructure independent of business transactional requirements. As a result, these embodiments are able to reduce the future likelihood of processes that need to "peer into" the guts of system to spy pending transaction activity or other state. Application activity can instead leverage end data stores which are better designed to support processes and tools.

Logical transactions work in conjunction with normal non-transactional flow via optimistic locking. The transactions are feeble (i.e., optimistic) compared to the data flow in that any flow that conflicts with a transaction will cause the transaction to fail, not the flow. It is possible to make transactions strong (i.e., locking) by creating logical flow failures using locking transactions that invalidate all data that arrives during a transaction that is not part of the transaction. However, backing up flow on the data distribution system (not physically, but through logical invalidation) seems against the spirit of guaranteed eventually consistent distribution. Such a feature, if ever needed, would have to be used with great care.

Logical transactions take advantage of hardware trends where storage capacity has grown and continues to grow many-fold, but 10 capabilities are lagging behind that growth. Capturing and storing all proposed transactions is cheap; the waste of space is not such a concern. As mentioned above, having failed transaction information available for some time is great for understanding and tuning the system.

There can be a considerable difference between schemas for managing flowing or changing data and schemas for reporting static data. Curation can be used in some embodiments for converting transaction-ridden distributed data into cleaner forms better suited to historical query.

Some embodiments can use a dynamic message cargo to dynamically optimize message flow for messages of variable size. All message bundles can still be stored in the Archive in complete form, including control, index, quality, and data segments. For large messages (the "large" threshold is configurable in the bundler), all but the data section may be published on the EMS bus, signaling successful archiving of the bundle. The transformers then reach back to request the data bundle from the archive. However, for large counts of small messages, we can publish the entire message including the data section, obviating the need for consumers to come back and request the data.

Transformers consuming dynamic messages then have a contract to respect the data content that is sent to them. For pure control messages, they reach back and grab the large data from archive. For small messages, they can simply go ahead and consume the data in the message and forgo the extra trip (and spare the archive server from getting swamped with requests for small datasets). This dynamic strategy becomes very important as we ramp up different message flows with edits, blessing and variable message contents. Flows that are suitable for push will push. Flows with very large datasets suitable for file-store-and-fetch will do that automatically without any adjustment to the various server processes. The system becomes highly tunable by adjustments to bundling sizes, message thresholds, and compression strategies.

Packet size tuning can be left to operational teams that manage infrastructure. Infrastructure can be expected to change frequently and be different from environment to environment. Tiered storage solutions will evolve, and optimal packaging for transport changes almost every time hardware is upgraded. This is why bundles are given a three-threshold configuration: by time threshold, by size threshold, and by logical row count threshold.

Subscription With Heartbeat is a combined approach to subscribing to non-durable messages while occasionally polling. The heartbeat (poll) alleviates durable store-and-forward responsibilities on producers and gives flow architects the ability to choose between durable and non-durable publication of control. However, benefits of a heartbeat go beyond simple monitoring checks when heartbeat is coupled with recovery logic; the combination gives a very simple and robust implementation of recovery.

As an example, consider the following transformer's consumption of bundles. A transformer starts up by asking the transform repository how far it has gone in processing—in other words, what is the next bundle to process and store in the repository. It then calls the archive service for the next n bundles to process (whatever seems like a reasonable number). The archive service returns the bundles. After processing the batch, the transformer waits some time for a signal to come from the Archive Service indicating a desired number of bundles are ready for the next batch.

If bundles are ready, the transformer requests the next step—repeating step 1. If no bundles are ready and there has been no incoming activity, the transformer will wait for the configured time interval before going and requesting bundles anyway. Remember, signals are not durable, so there is a small chance that no signal will arrive, but the transformer must go and ask to be certain. If there are still no bundles, then the time decay adds some amount to wait for the next heartbeat check. The heartbeats keep slowing down. When bundles are finally available again, they are fetched, and the heartbeat rate is increased again for more frequent polling in absence of control messages.

Data targets bear some responsibility for allowing the data distribution system to ensure consistency. They must make data readable back to the data distribution system if the data distribution system is to manage consistency of the data created. However, this is normally a small cost relative to the gain from a reduced need for reconciliations between targets.

Data versioning can be used for getting consistent data across different target data stores. For the data distribution system clients, the version strategy requires a shift away from traditional ACID approaches and into an approach where every request for data returns not only the data, but also the stream clock information. Queries that need to be consistent across different destinations need to provide the stream clock time (the bundle ID) in order to get the same results, or fail/warn if data is not yet available. However, the data distribution system's contract is that the data will be consistent eventually.

Updates of data are essentially just replacements of the same data, where "same" is determined by an identity strategy. Identity strategies are basically a selection of key attributes by which to rank/order and select. Later data arriving in a stream of the same identity replaces earlier data. However, data is not always controlled or replaced or invalidated by identity. In some cases, it makes sense to manage data by attributes outside of identity. Logical data sets, explained below, are another way to manage collections of data not by identity, but by other attributes such as by whom the data was submitted or for what purpose.

The identity service is another example of how a data flow that has embedded declarative structure can have great advantages over unstructured flows. The identity services can generate short integer identity keys in the flow for a subset of chosen columns and enrich the dataset using these keys. Such keys serve as a performance boost for report operations in any target store. This is especially effective when modeling broad, denormalized streams, which is often a practice for distributed sourcing. Currently, we plan to use daily-generated key sets because it is only within the daily flow where the boost is needed. Historical key generation does not need to be done within the flow.

The load control table is the way to ensure the data for a particular series is consistent with respect to checksums. Clients that want absolute assurance that they select only checked-out reconciled data need to use the load control table to determine the highest watermark that they can safely select. For example: Select from Dataset where BundleID< (Select MIN(InvalidBundleStatus) from Dataset-Control) . . . where InvalidBundleStatus is determined by finding the lowest bundle ID that has not yet been successfully validated or by returning MAX bundle ID+1. Such an algorithm treats all pending validations as invalid until run.

While this adds some complexity overhead to clients that care about bundle check status, the leverage gained from bundle size relative to individual data items (typically in the 1000's to 1), means no noticeable performance overhead. One advantage of such a system is that it puts criticality of checksum failure in the hands of the client. It can very well be the case in very large data flows that a client still wants access to data, even knowing a checksum failed. The client may very well decide, based on the immateriality of the data, to use subsequent data while the bad data is being repaired.

Logical data sets are an extension of the idea used for creating transactions. Since bundles are a physical packet domain owned completely by infrastructure operations for tuning flow, a separate logical construct must be introduced to manage any type of application data set. A logical data set is created by sending out a logical data set definition with a unique identity and then tagging all subsequently submitted data with that identity. The logical data set definition is published on a separate stream with a separate structure from the data stream(s) to which it refers. Clients can then select properties of the logical set stream and select out the data to which it applies.

Logical data sets help facilitate completeness functionality. Similar to transactions, completeness criteria supplied in the logical data stream and tagged against relevant data can indicate whether all data within a logical set is available in a particular reporting store.

Transactions are one type of completeness logical data set with an added factor of timeout checking. Since logical sets are represented as streams, they enjoy the same bundle and versioning features as regular data streams. This means that logical set information can evolve just as data in data streams. And so a series of logical events is queued up in a stream, and there is a logical clock against which to align all of these logical events across systems. A good strategy is to allow logical set events to show up as included or excluded from default general consumption. The logical event stream can, in this way, form a common perspective on the data for all consumers, while consumers may choose to include or ignore certain components in their own preview—and then push out status updates to the logical set stream to make desired aspects public. The official common view of data and events can then be communicated as stream/max bundle ID pairings for both data sets and logical data sets. This is perhaps the most concise and intuitive way to express such a selection of complex streamed events.

The publication of a set of approved pairings of streams and bundle IDs is known as a "Blessing". Blessings can be published by any stream authority who has determined that the data stream as of a particular point is good for consumption. Blessings of parallel-delivered streams provide parallel availability of large data sets and coordination/consistency in using those data sets.

Edits within some embodiments are another form of logical dataset. Data that is being modified is simply added to a stream to replace the prior versions of that data with a unique edit identity to tie it to all other data in the edit. In this way, an edit can be included or ignored. Deletes are a special form of modification. A delete may be implemented as an invalidation of a particular logical set. For example, a bad sourcing run could be "deleted" by ignoring the logical set associated with that sourcing run. Deletes of individual items independent of invalidating any particular logical set, would be done by submitting a data item with the same identity of what is to be deleted and a logical delete status set to true in the data table.

Fault tolerance can be achieved through dual flows off of a replicated message archive. Given that all data can be regenerated off of the archive, the only critical point of consideration is how to create fault tolerance of the archive itself.

Exemplary Computer System Overview

Figure 8:
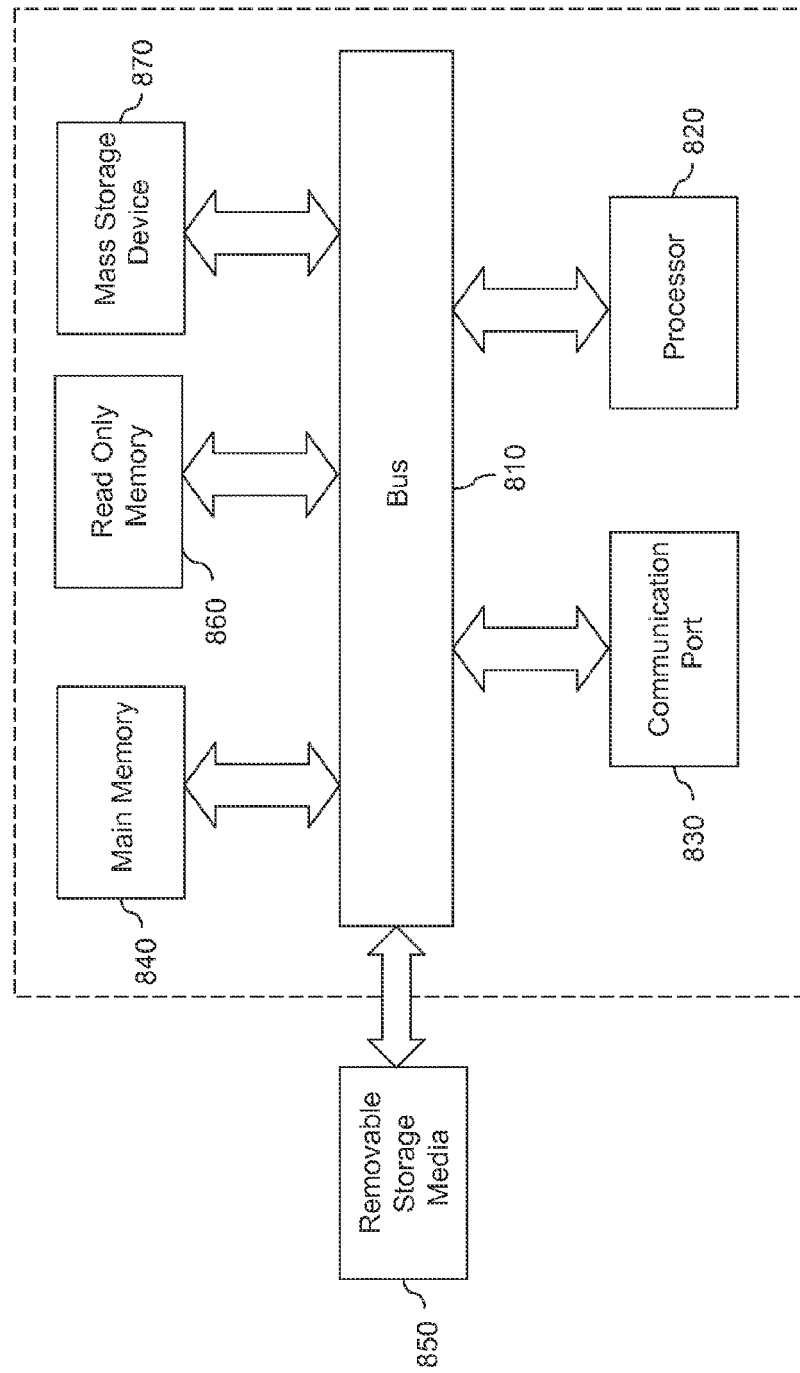
FIG. 8 illustrates an example of a computer system with which some embodiments of the present technology may be used.

Embodiments of the present technology include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 8 is an example of a computer system 800 with which embodiments of the present technology may be utilized. According to the present example, the computer system includes a bus 810, at least one processor 820, at least one communication port 830, a main memory 840, a removable storage media 850, a read only memory 860, and a mass storage 870.

Processor(s) 820 can be any known processor, such as, but not limited to, an Intel® processor(s); AMD® processor(s); ARM-based processors; or Motorola® lines of processors. Communication port(s) 830 can be any of an RS-232 port for use with a modem-based dialup connection, a 10/100 Ethernet port, or a Gigabit port using copper or fiber. Communication port(s) 830 may be chosen depending on a network such as a Local Area Network (LAN), Wide Area Network (WAN), or any network to which the computer system 800 connects.

Main memory 840 can be Random Access Memory (RAM) or any other dynamic storage device(s) commonly known in the art. Read only memory 860 can be any static storage device(s) such as Programmable Read Only Memory (PROM) chips for storing static information such as instructions for processor 820.

Mass storage 870 can be used to store information and instructions. For example, hard disks such as the Adaptec® family of SCSI drives, an optical disc, an array of disks such as RAID, such as the Adaptec family of RAID drives, or any other mass storage devices may be used.

Bus 810 communicatively couples processor(s) 820 with the other memory, storage and communication blocks. Bus 810 can be a PCI/PCI-X or SCSI based system bus depending on the storage devices used.

Removable storage media 850 can be any kind of external hard-drives, floppy drives, IOMEGA® Zip Drives, Compact Disc-Read Only Memory (CD-ROM), Compact Disc-Re-Writable (CD-RW), and/or Digital Video Disc-Read Only Memory (DVD-ROM).

The components described above are meant to exemplify some types of possibilities. In no way should the aforementioned examples limit the scope of the application, as they are only exemplary embodiments.

In conclusion, the technology of the present application provides novel systems, methods and arrangements for structured data distribution. While detailed descriptions of one or more embodiments of the technology have been given above, various alternatives, modifications, and equivalents will be apparent to those skilled in the art without varying from the spirit of the application. For example, while the embodiments described above refer to particular features, the scope of this application also includes embodiments having different combinations of features and embodiments that do not include all of the described features.

What is claimed is:

1. A method comprising:
   receiving, with programmable circuitry, streaming data from a data producer;
   determining from the streaming data, with the programmable circuitry, that the streaming data should be bundled together in accordance with a set of bundling parameters;
   bundling, with the programmable circuitry, the streaming data into packages of data having a standard format with a first portion and a second portion, wherein the first portion includes a unique identifier of a package of data and a quality indicator generated by the data producer, and wherein the second portion includes data;
   ordering, with the programmable circuitry, each of the packages of data using a series of consecutive integers produced by a master clock;
   archiving, with the programmable circuitry, the packages of data in a memory;
   simultaneously to archiving, assigning the packages of data to parallel data streams, and publishing at least the first portion of the packages of data in the parallel data streams;
   receiving requests generated by data consumers through an Application Programming Interface, wherein the requests include a request for a subscription to a portion of the streaming data; and
   delivering to the data consumers packages of data corresponding to the subscription.

2. The method of claim 1, further comprising:
   continuously streaming a first data stream from the data producer to a data subscriber, wherein a second data stream provides control information related to the first data stream which allows the data subscriber to request replay of the first data stream.

3. The method of claim 2, wherein the speed of the second data stream is independent from the speed of the first data stream.

4. The method of claim 2, further comprising:
   receiving a request from the data subscriber to replay data, wherein the request includes a logical bound on the data to be replayed and identifies a format for the data subscriber;
   retrieving, from the memory, data consistent with the logical bound, and
   transforming the package of data into the format.

5. The method of claim 1, wherein each of the parallel data streams are assigned a flow priority.

6. The method of claim 1, further comprising:
   receiving packages of data, with a transformer, and generating loadable data structures for a reporting store associated with a data consumer; and receiving and storing, with a loader, the loadable data structures into a storage device associated with the data consumer in a monotonically increasing order based on an order of upload from the data producer.

7. The method of claim 1, wherein bundling the data includes identifying data that when compressed will result in each package in the packages of data having a desired size.

8. The method of claim 1, wherein bundling the data includes associating new metadata with each of the bundled packages.

9. The method of claim 1, wherein the unique identifier is generated based on the series of consecutive integers produced by the master clock.

10. The method of claim 1, further comprising using columnar checksums for verifying the data.

11. The method of claim 10, wherein the columnar checksums allow for rounding errors with a specified tolerance.

12. The method of claim 6, wherein until an indication from an archive is received that packages of data are available, the transformer queries the archive for the packages of data at increasing time intervals.

13. A system comprising:
a memory; and
programmable circuitry configured to:
  receive streaming data from a data producer;
  determine from the streaming data, with the programmable circuitry, that the streaming data should be bundled together in accordance with a set of bundling parameters;
  bundle the streaming data into packages of data having a standard format with a first portion and a second portion, wherein the first portion includes a unique identifier of a package of data and a quality indicator generated by the data producer, and wherein the second portion includes data;
  order each of the packages of data using a series of consecutive integers produced by a master clock;
  archive the packages of data in the memory;
  simultaneously to archiving, assign the packages of data to parallel data streams, and publish at least the first portion of the packages of data in the parallel data streams;
  receive requests generated by data consumers through an Application Programming Interface, wherein the requests include a request for a subscription to a portion of the streaming data; and
  deliver to the data consumers packages of data corresponding to the subscription.

14. The system of claim 13, the programmable circuitry further configured to:
continuously stream a first data stream from the data producer to a data subscriber, wherein a second data stream provides control information related to the first data stream which allows the data subscriber to request replay of the first data stream.

15. The system of claim 14, wherein the speed of the second data stream is independent from the speed of the first data stream.

16. The system of claim 14, the programmable circuitry further configured to:
receive a request from the data subscriber to replay data, wherein the request includes a logical bound on the data to be replayed and identifies a format for the data subscriber;
retrieve, from the memory, data consistent with the logical bound; and
transform the packages of data into the format.

17. The system of claim 13, the programmable circuitry further configured to:
receive packages of data, with a transformer, and generate loadable data structures for a reporting store associated with a data consumer; and
receive and store, with a loader, the loadable data structures into a storage device associated with the data consumer in a monotonically increasing order based on an order of upload from the data producer.

18. The system of claim 17, wherein until an indication from an archive is received that packages of data are available, the transformer queries the memory for the packages of data at increasing time intervals.

* * * * *